United States Patent
Lin et al.

(10) Patent No.: US 6,424,896 B1
(45) Date of Patent: Jul. 23, 2002

(54) STEERING COLUMN DIFFERENTIAL ANGLE POSITION SENSOR

(75) Inventors: Yingjie Lin; Warren Baxter Nicholson; Steven Douglas Thomson, all of El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/726,057

(22) Filed: Nov. 29, 2000

Related U.S. Application Data

(60) Provisional application No. 60/193,304, filed on Mar. 30, 2000.

(51) Int. Cl.[7] .............................. B62D 1/00; B62D 3/00
(52) U.S. Cl. ........................... 701/41; 180/6.2; 180/6.6; 280/5.51
(58) Field of Search .............................. 701/41; 180/6.2, 180/6.6, 280; 280/5.51

(56) References Cited

U.S. PATENT DOCUMENTS

| | | | | |
|---|---|---|---|---|
| 3,876,030 A | * | 4/1975 | Komamura et al. | 180/427 |
| 3,983,953 A | * | 10/1976 | Bayle | 180/446 |
| 4,687,214 A | * | 8/1987 | Uno | 180/414 |

* cited by examiner

*Primary Examiner*—Yonel Beaulieu
(74) *Attorney, Agent, or Firm*—Margaret A. Dobrowitsky

(57) ABSTRACT

A steering column differential angle position sensor includes an upper flux shutter and a lower flux shutter, both of which form a plurality of similarly shaped openings. Receiver and transmitter coils are coaxially aligned with the shutters. The transmitter coil provides a magnetic field around the shutters, with changes in the field being sensed by the receiver coil upon differential motion of the flux shutters. Using the output of the receiver coil, the torque on a steering column that is mechanically coupled to the shutters can be obtained.

17 Claims, 2 Drawing Sheets

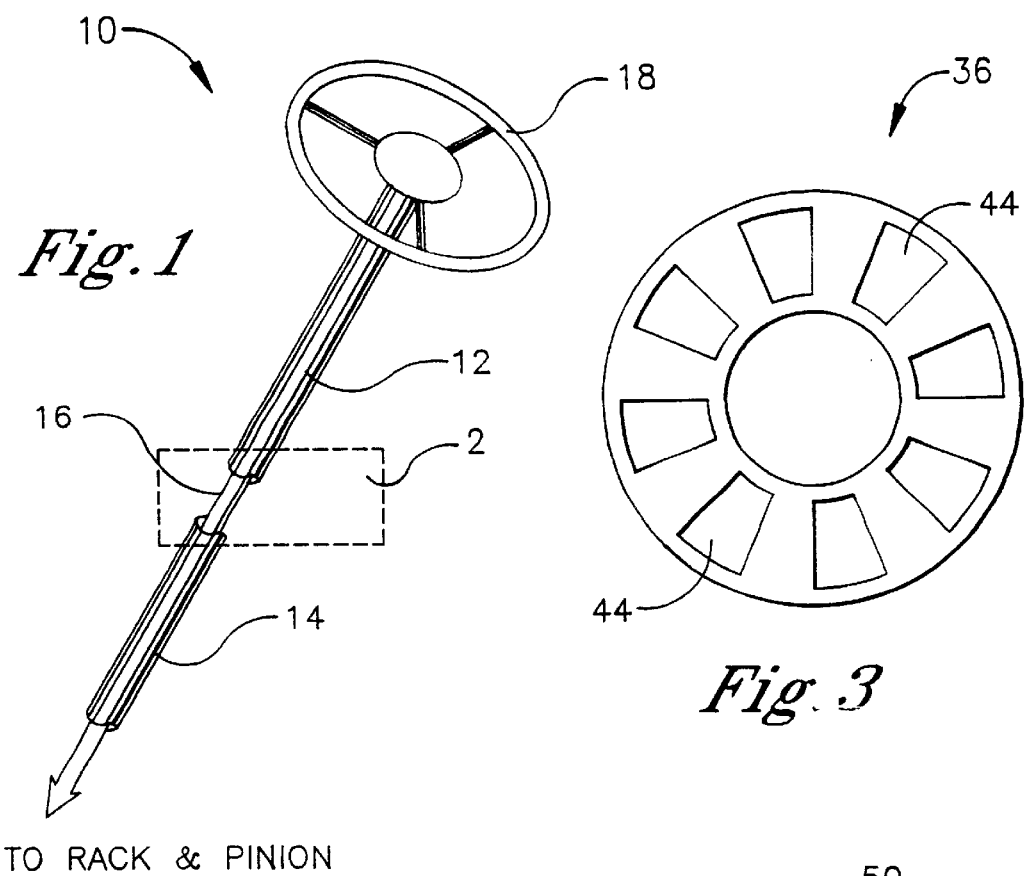
Fig. 1
Fig. 3
TO RACK & PINION
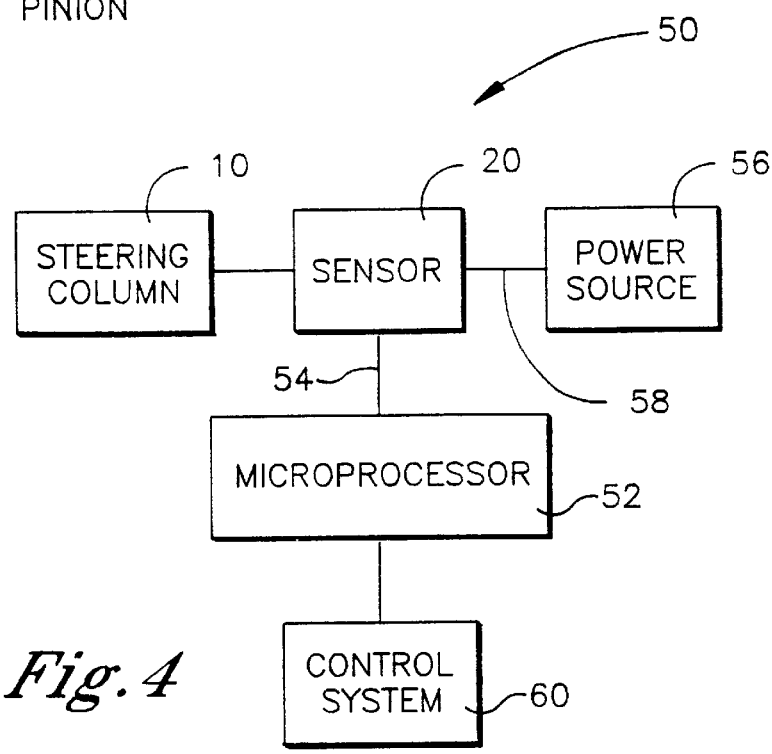
Fig. 4

STEERING COLUMN DIFFERENTIAL ANGLE POSITION SENSOR

RELATED APPLICATIONS

The present application claims priority from provisional U.S. patent application Ser. No. 60/193,304, filed Mar. 30, 2000.

TECHNICAL FIELD

The present invention relates to steering column torque sensors.

BACKGROUND OF THE INVENTION

Power assisted steering is a standard motor vehicle equipment feature. It happens that in order for a typical power steering control system to properly operate, a steering column torque sensor must be included in the system to close the control loop. Torque sensors, such as resistance strip/strain gauge sensors, capacitance sensors, eddy-current sensors, magneto-elastic sensors, and transformer/strain gauge sensors, have been provided to determine the torque on the steering column. However, these sensors lack the sensitivity required for many of the present power steering control systems. Moreover, these sensors are extremely sensitive to changes in temperature and have limited durability.

The present invention has recognized the above-mentioned prior art drawbacks, and has provided the below-disclosed solutions to one or more of the prior art deficiencies. More specifically, the present invention understands that for reliability, durability, and sensitivity reasons, a non-contact torque sensor can be used to measure torque on a rotating shaft.

SUMMARY OF THE INVENTION

A sensor for measuring differential angular displacement between a first shaft segment and a second shaft segment includes a first flux shutter that is coupled to the first shaft segment and a second flux shutter that is coupled to the second shaft segment. The second flux shutter is coaxially aligned with the first flux shutter, and the first flux shutter and the second flux shutter form a plurality of openings. The sensor also includes at least one transmitter coil that is energizable to provide a magnetic field around the flux shutters and at least one receiver coil that senses a change in the magnetic flux that reaches the receiver coil when the flux shutters move relative to each other. The sensor outputs a signal representative of the relative angular orientation of the flux shutters.

In a preferred embodiment, a housing surrounds the coils and the flux shutters. Preferably, a torsion bar couples the first shaft and the second shaft. Moreover, the housing defines a vertical axis and the flux shutters are disposed within the housing perpendicular to the axis. In the preferred embodiment, the receiver coil is surrounded by a first flux concentrator and the transmitter coil is surrounded by a second flux concentrator. The sensor further includes at least one reference target coaxially aligned with the flux shutters and at least one reference coil coaxially aligned with the flux shutters. The reference coil and reference target are used to compensate for changes in the sensor caused by temperature changes.

In another aspect of the present invention, a power steering control system includes a microprocessor, a power source, and a steering column differential angle position sensor. The steering column differential angle position sensor is electrically coupled to the microprocessor, electrically coupled to the power source and mechanically coupled to a steering column. The position sensor transmits a signal to the microprocessor that represents an angular displacement between a first flux shutter and a second flux shutter.

In yet another aspect of the present invention, a method for controlling a power steering system includes installing a first flux shutter on a first steering shaft segment and installing a second flux shutter on a second steering shaft segment. In this aspect of the present invention, the method also includes sensing a differential angular position between the first flux shutter and the second flux shutter and generating a signal representing the differential angular position.

The present invention will now be described, by way of example, with reference to the accompanying drawings, in which:

BRIEF DESCRIPTION OF THE DRAWINGS

FIG. 1 is a perspective view of a steering column;

FIG. 3 is a top plan view of the upper flux shutter;

FIG. 4 is a block diagram representing a vehicle steering control system.

DESCRIPTION OF AN EMBODIMENT OF THE INVENTION

Figure 2:
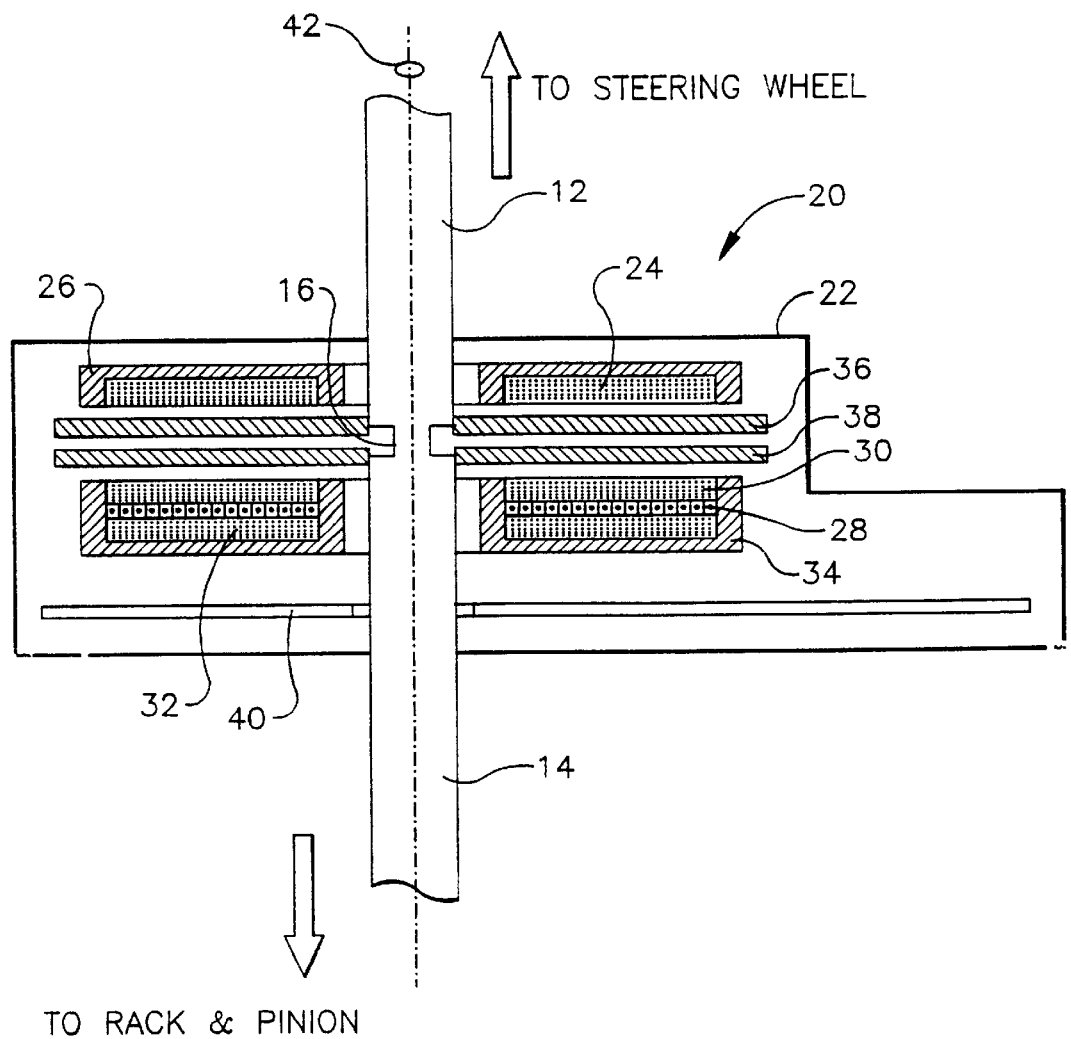
FIG. 2 is a cross-sectional view of a steering column differential angle position sensor as seen in box 2 in FIG. 1.

Referring initially to FIG. 1, a motor vehicle steering column is shown and generally designated 10. FIG. 1 shows that the steering column includes an upper steering shaft 12 and a lower steering shaft 14 connected by a torsion bar 16. As shown in FIG. 1, the upper steering shaft 12 is connected to a steering wheel 18. The lower steering shaft 14 is connected to a rack and pinion (not shown) or other steering mechanism coupled to the wheels of a vehicle. It is to be appreciated that the steering column differential angle position sensor, described below, is installed along the steering column 10 at the junction of the upper and lower steering shafts 12, 14, i.e., around the torsion bar 16 in the area indicated by dashed box 2.

Referring to FIG. 2, a steering column differential angle position sensor is shown and generally designated 20. FIG. 2 shows that the steering column differential angle position sensor 20 includes a hollow, toroidal housing 22 that, in a preferred embodiment, is manufactured from a non-ferromagnetic material. Within the housing 22 and circumscribing the upper steering shaft 12, is a generally disk-shaped receiver coil 24 closely surrounded by an upper flux concentrator 26. As shown in FIG. 2, the sensor 20 also includes a solid, preferably metal, generally disk-shaped reference target 28 sandwiched between a generally disk-shaped transmitter coil 30 and a generally disk-shaped reference coil 32. The transmitter coil 30, reference target 28, and reference coil 32 are closely surrounded by a lower flux concentrator 34 and circumscribe the lower steering shaft 14. Preferably, the upper and lower flux concentrators 26, 34 are manufactured from a high permeability soft magnetic material which allows the concentrators 26, 34 to contain and concentrate the magnetic flux from the coils 24, 30, 32. In a preferred embodiment, the coils 24, 30, 32 are made using printed circuit or bonded coil technology.

Continuing to refer to FIG. 2, a generally disk-shaped upper flux shutter 36 and a generally disk-shaped lower flux shutter 38 are disposed within the sensor housing 22.

Preferably, the upper flux shutter 36 and lower flux shutter 38 are manufactured from a high permeability soft magnetic material. FIG. 2 shows that the upper flux shutter 36 is rigidly affixed to the upper steering shaft 12 and rotates with the upper steering shaft. Conversely, the lower flux shutter 38 is rigidly affixed to the lower steering shaft 14 and, accordingly, rotates therewith. It may now be appreciated that any torque on the upper steering shaft 12 will turn the upper flux shutter 36 relative to the lower flux shutter 38. As shown in FIG. 2, a printed circuit board 40 is also disposed within the sensor housing 22.

FIG. 2 shows that the flux shutters 36, 38 are installed within the housing 22 such that they are parallel to each other and parallel to the coils 24, 30, 32. As shown in FIG. 2, the steering shafts 12, 14 define an axis 42 and the sensor 20 is installed around the steering shafts 12, 14 such that the internal components of the sensor 20, e.g., the coils 24, 30, 32 and flux shutters 36, 38, are perpendicular to the axis 42. Moreover, the flux shutters 36, 38 and the coils 24, 30, 32 are coaxially aligned with each other within the housing along the axis 42.

Referring now to FIG. 3, the upper flux shutter 36 is shown. FIG. 3 shows that the upper flux shutter 36 is formed with a plurality of equally sized and shaped openings 44 that are equally radially spaced around the flux shutter 36. It is to be appreciated that the size and shape of the shutter openings 44 can be altered depending on the measurement range of the sensor 20 and the transfer function of the magnetic circuit formed by the coils 24, 30, 32. It is also to be appreciated that the lower flux shutter 38 (not shown in FIG. 3) includes the same number of openings as the upper flux shutter 36.

Preferably, the centers of the openings 44 formed by the flux shutters 36, 38 are placed the same distance from the centers of the flux shutters 36, 38 and are equally radially spaced around the flux shutters 36, 38. However, in a preferred embodiment, the openings formed by one of the flux shutters 36, 38, e.g., the lower flux shutter 36, are relatively smaller than the openings 44 formed by the upper flux shutter 38 to compensate for any unwanted transverse motion of the lower flux shutter 36 relative to the upper flux shutter 38.

Without any torque applied to the torsion bar 16, the openings 44 formed by the upper flux shutter 36 and the openings 44 formed by the flux shutter 38 are approximately fifty percent (50%) overlapped. At zero torque, approximately fifty percent (50%) of the total possible open area of the flux shutters 36, 38 between the transmitter coil 30 and the receiver coil 24 is available. However, when a torque is applied to the upper steering shaft 12 and friction such as tire to road friction is present on the lower shaft 14, the torsion bar 16 twists at a predetermined spring rate. The twisting of the torsion bar 16 creates a differential angle between the flux shutters 36, 38 which changes the open area through the flux shutters 36, 38. The direction of applied torque, either clockwise or counter-clockwise, is also of interest. When a torque is applied in one direction on the upper shaft 12, the open area through the flux shutters 36, 38 will increase from fifty percent (50%) to near one hundred percent (100%). On the other hand, when a torque is applied to the upper shaft 12 in the opposite direction, the open area through the flux shutters 36, 38 decreases from fifty percent (50%) to near zero percent (0%). As the area through the flux shutters 36, 38 increases, the amount of flux reaching the receiver coil 24 increases, and as such, the voltage present across the receiver coil 24 increases. Likewise, as the area through the flux shutters 36, 38 decreases, the voltage across the receiver coil 24 decreases. The change in voltage at the receiver coil 24 is used to determine the differential angle between the upper flux shutter 36 and the lower flux shutter 38. Moreover, the direction of motion between the flux shutters 36, 38 can be determined.

By knowing the differential angle between the upper flux shutter 36 and the lower flux shutter 38 the angle of twist between the top and bottom of the torsion bar 16 can be determined. As is known in the art, by knowing the torsional spring rate and the angle of twist, the torque acting on the torsion bar during steering can be determined and a steering control system can compensate accordingly.

Thus, by energizing the transmitter coil 30 to create a magnetic field around the flux shutters 36, 38 and using the receiver coil 24 to sense changes in the flux caused by relative motion between the upper and lower flux shutters 36, 38, a torque on the steering column 10 that is mechanically coupled to the sensor 20 can be determined by a microprocessor, described below. As intended herein, the reference coil 32 and reference target 28 are used to provide a reference output that varies due to temperature changes in the flux shutters 36, 38 and coils 24, 30. The reference sensor output is used to compensate the main sensor output due to temperature effects.

Referring now to FIG. 4, a block diagram representing a steering system is shown and designated 50. FIG. 4 shows that the steering system 50 includes the steering column differential angle position sensor 20, which is electrically coupled to a microprocessor 52 via electrical line 54. FIG. 4 also shows that the steering column differential angle position sensor 20 is electrically coupled to a power source 56 via electrical line 58 and mechanically coupled to the steering column 10 as described above.

Accordingly, the microprocessor 52 processes the signals sent from the sensor 20 to determine a steering column 10 torque based on the differential angular positions of the upper and lower flux shutters 36, 38. The microprocessor 52 can then control a vehicle control system 60 using the steering column 10 torque signal.

It is to be appreciated that the receiver coil 24 and the reference coil 32 may include a capacitor across the terminals of each coil 24, 32 to resonate these coils 24, 32 at the frequency of the transmitter coil 30 and produce higher voltages in the receiver coil 24 and reference coil 32.

With the configuration of structure described above, it is to be appreciated that the steering column differential angle position sensor 20 provides a relatively sensitive, relatively compact, and relatively durable means for determining the torque on a steering column 10 based on the change in magnetic flux reaching the receiver coil 24 due to the relative position of the upper flux shutter 36 and the lower flux shutter 38.

While the particular steering column differential angle position sensor 20 as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A sensor for measuring differential angular displacement between a first shaft segment and a second shaft segment, comprising:
    a first flux shutter coupled to the first shaft segment, the first flux shutter forming a plurality of openings;
    a second flux shutter coupled to the second shaft segment and coaxially aligned with the first flux shutter, the second flux shutter forming a plurality of openings;
    at least one transmitter coil energizable to provide a magnetic field around the flux shutters; and
    at least one receiver coil sensing a change in the magnetic flux reaching the receiver coil when the flux shutters move relative to each other, the sensor outputting a signal representative of the differential angular orientation of the flux shutters.

2. The sensor of claim 1, further comprising:
    a housing surrounding the coils and the flux shutters.

3. The sensor of claim 2, further comprising:
    a torsion bar mechanically coupling the first shaft and the second shaft.

4. The sensor of claim 2, wherein the housing defines a vertical axis and the flux shutters are disposed within the housing perpendicular to the axis.

5. The sensor of claim 1, wherein the receiver coil is surrounded by a first flux concentrator and the transmitter coil is surrounded by a second flux concentrator.

6. The sensor of claim 1, further comprising:
    at least one reference target coaxially aligned with the flux shutters; and
    at least one reference coil coaxially aligned with the flux shutters, the reference coil and reference target being used to compensate for changes in the sensor caused by temperature changes.

7. A power steering control system comprising:
    a microprocessor;
    a power source; and
    a steering column differential angle position sensor electrically coupled to the microprocessor, electrically coupled to the power source and mechanically coupled to a steering column, the differential angle position sensor transmitting a signal to the microprocessor representing a differential angular displacement between a first flux shutter and a second flux shutter.

8. The power steering control system of claim 7, further comprising:
    a vehicle control system connected to the microprocessor.

9. The power steering control system of claim 7, wherein the steering column differential angle position sensor comprises:
    a first flux shutter coupled to a first steering shaft segment, the first flux shutter forming a plurality of openings;
    a second flux shutter coupled to a second steering shaft segment and coaxially aligned with the first flux shutter, the second flux shutter forming a plurality of openings;
    at least one transmitter coil coaxially aligned with the flux shutters, the transmitter coil being energized to provide a magnetic field around the flux shutters; and
    at least one receiver coil coaxially aligned with the flux shutters, the receiver coil sensing a change in the magnetic field when the flux shutters move relative to each other, the sensor outputting a signal representative of the differential angular orientation of the flux shutters.

10. The system of claim 9, wherein the sensor further comprises:
    a housing surrounding the coils and the flux shutters.

11. The system of claim 9, further comprising:
    a torsion bar mechanically coupling the first steering shaft and the second steering shaft.

12. The system of claim 10, wherein the housing defines a vertical axis and the flux shutters are disposed within the housing perpendicular to the axis.

13. The system of claim 9, wherein the receiver coil is surrounded by a first flux concentrator and the transmitter coil is surrounded by a second flux concentrator.

14. The system of claim 9, wherein the sensor further comprises:
    at least one reference target coaxially aligned with the flux shutters; and
    at least one reference coil coaxially aligned with the flux shutters, the reference coil and reference target being used to compensate for changes in the sensor caused by temperature changes.

15. A method for controlling a power steering system comprising the acts of:
    installing a first flux shutter on a first steering shaft segment;
    installing a second flux shutter on a second steering shaft segment;
    sensing a differential angular position between the first flux shutter and the second flux shutter; and
    generating a signal representing the differential angular position.

16. The method of claim 15, further comprising the act of:
    processing the signal to determine a torque on a steering column based on the differential angular position.

17. The method of claim 15, further comprising the act of:
    sending a signal representing the torque on the steering column to a control system.

* * * * *